Jan. 17, 1939. M. G. CHANDLER 2,143,938
FUEL FEEDING MEANS FOR INTERNAL COMBUSTION ENGINES
Original Filed May 14, 1934 14 Sheets-Sheet 2

INVENTOR
*Milford G. Chandler*
BY *Edward C. Gritzbaugh*
ATTORNEY

Jan. 17, 1939.　　　M. G. CHANDLER　　　2,143,938
FUEL FEEDING MEANS FOR INTERNAL COMBUSTION ENGINES
Original Filed May 14, 1934　　14 Sheets-Sheet 4

INVENTOR
Mitford G. Chandler
BY Edward C. Fitzhugh
ATTORNEY

Patented Jan. 17, 1939

2,143,938

UNITED STATES PATENT OFFICE

2,143,938

FUEL FEEDING MEANS FOR INTERNAL COMBUSTION ENGINES

Milford G. Chandler, Flint, Mich., assignor, by mesne assignments, to Borg-Warner Corporation, Chicago, Ill., a corporation of Illinois Refiled for abandoned application Serial No. 725,666, May 14, 1934. This application August 17, 1938, Serial No. 225,490. In Great Britain February 11, 1938

12 Claims. (Cl. 103—162)

This invention relates to a fuel feeding means for internal combustion engines and is an improvement on the construction of fuel feeding means for internal combustion engines disclosed in my application filed July 5, 1928, Serial No. 290,492, since issued as Patent No. 2,022,653, bearing date of December 3, 1935. This application is a companion of my applications Serial No. 725,665 and Serial No. 725,667, and is a duplicate of my copending application Serial No. 725,666, filed May 14, 1934. It is an object of my invention to provide a construction of fuel measuring pump to be used in connection with the fuel system in which the length of the pump can be shortened without reducing the length of the cone bearing for the rotor.

Another object of my invention is to provide novel means for lubricating the contacting surfaces of the rotor and cone by providing slots and pockets within the inclined surfaces of the cone and rotor which have a tendency to collect and build up pressure sufficient to overcome the bearing pressure resulting from the tension of the spring for holding these two members in contact.

Another object of my invention is to provide a fuel feeding system for an internal combustion engine in which the measuring pump in which the fuel charges are measured is in circuit with a fuel circulating system to prevent the forming of vapor in the pipe line whereby the vapor or bubbles are prevented from being drawn into the measuring pump.

Another object of my invention is to provide an improved plunger operating mechanism whereby the plungers are operated through suitable mechanism which is very strong and durable.

A still further object of the invention is to provide the pump with timing means wherein anyone can set the pump properly for the beginning of the injection to cylinder number one of the internal combustion engine to which the fuel feeding means is attached.

Another object of my invention is to provide means for assembling a pump without the aid of a power press by the use of a cone tensioning spring held in a semi-loaded condition by means of a bayonet lock arrangement so that the tension nut may be readily screwed into position against the shoulder to adjust the cone and rotor to a proper position whereby it will be held in contact under a definite tension.

Another object of my invention is to provide a circulating system for the fuel which reduces the heat of the pump as the fuel circulating therethrough carries off the heat generated.

A still further object of my invention is to provide an auxiliary pump in connection with the relief valve so as to build up and maintain pressure of fuel within the pump whereby vapor lock is prevented and an ample supply of fuel is supplied to the pump at all times, thereby preventing any danger of vapor accumulating in the line.

Another object of my invention is to provide novel means for holding the plunger guides into the rotor against the pressure of the packing spring which allows these guides to be readily inserted or detached.

Other and further objects and advantages of the invention will be hereinafter set forth and the novel features thereof defined by the appended claims.

In the drawings:

Fig. 13 is a transverse section taken on line 13—13 of Fig. 5;
Fig. 15 is a diagrammatic view of the cone and rotor showing the intake and exhaust ports for the pump cylinders and the pockets for lubricating the contacting faces of the cone and rotor;

Figure 1:
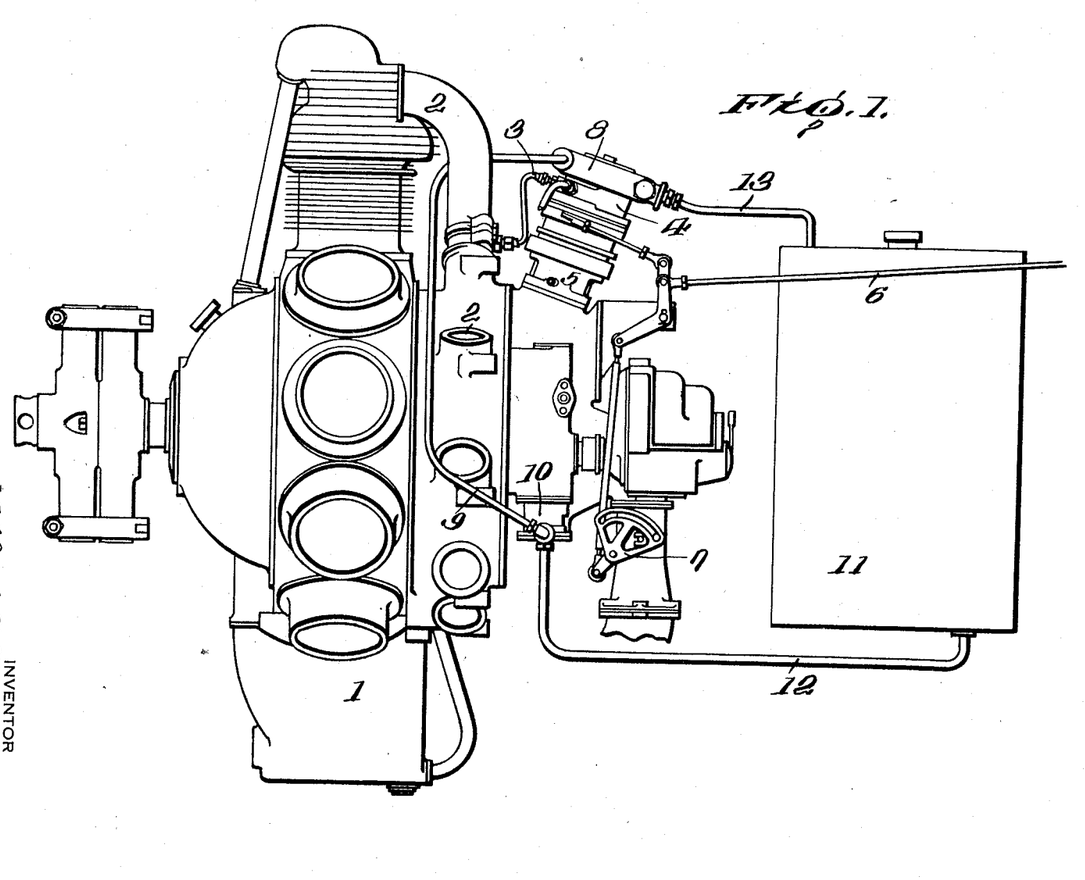
Fig. 1 is a side elevation showing the application of my improved construction of fuel feeding system to a multiple cylinder engine with an auxiliary pump for circulating fuel through the strainer of the pump.
Figure 2:
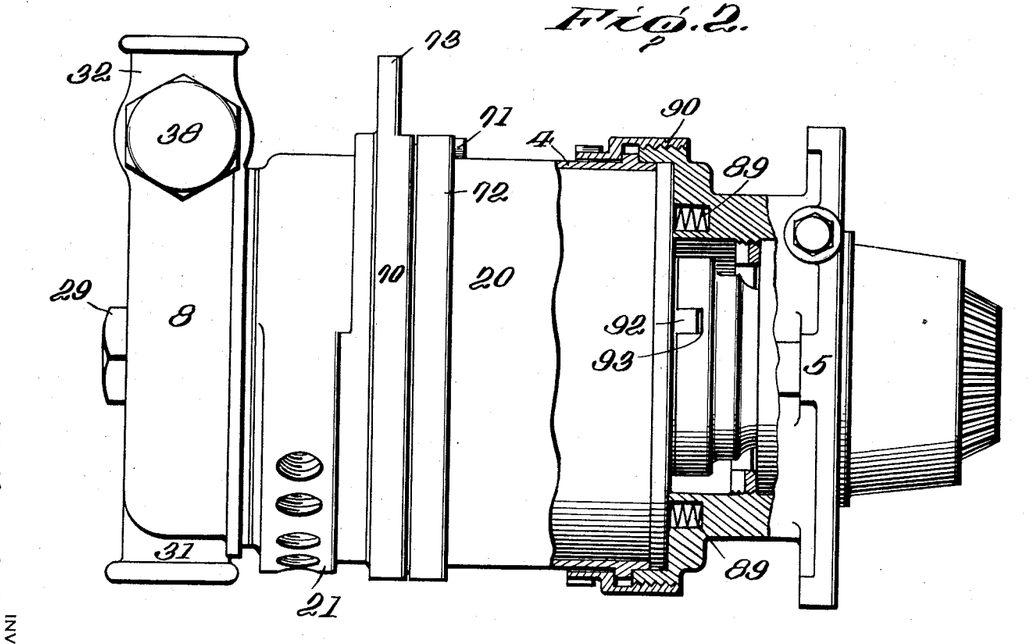
Fig. 2 is a side elevation of a pump showing its connection to the reduction gear assembly, partly in section.

In Figs. 1 and 2 of the drawings, I have illustrated means for installing my improved construction of fuel feeding means to an internal combustion engine in which 1 is a multiple cylinder internal combustion engine provided with an air manifold 2 in which is adapted to be disposed a spring loaded nozzle as disclosed in my application, Serial No. 290,492, filed July 5, 1928, or any other type of nozzle wherein pressure is built up in a fuel line supplying the same.

Fuel is supplied to the nozzle by a pipe 3 extending from the measuring pump 4 which is driven and timed by the engine through reduction gearing assembly 5. The measuring pump 4 is preferably of the construction employing means for varying the stroke of the piston by varying the positions of a non-rotatable cam, and is herein shown controlled by control mechanism 6 which in turn is connected to the air control 7 whereby the proper proportion of fuel to air is maintained.

The measuring pump is provided with a strainer 8 to which is connected a fuel inlet pipe 9 extending from an auxiliary pump 10 which is supplied with fuel from a reservoir 11 by a pipe 12. The strainer 8 is provided with an outlet to which is connected a pipe 13 extending to the reservoir 11, and when in operation, the pump 10 draws fuel from the reservoir 11 and causes it to circulate through the strainer which is in communication through suitable valve control mechanism with the respective cylinders of the measuring pump, whereby a circulating system for the fuel supplied to the measuring pump is provided which eliminates bubbles, reduces the heat and prevents vapor lock, all of which will be hereinafter more fully described.

While in the drawings I have shown diagrammatically the installation of my improved construction of fuel feeding system for internal combustion engines using a variable stroke pump attached to a nine cylinder engine, I do not wish to limit myself to the use of my improved construction of fuel feeding system to any type of mutiple cylinder engine, nor do I wish to limit myself to any particular manner of driving the pump so long as it is driven and timed by the engine, as I have only illustrated one form for accomplishing this result wherein a reduction gearing assembly is employed.

My improved construction of pump for delivering measured charges of fuel to the air intakes of an internal combustion engine comprises a cylindrical casing 20 provided with a head 21 having a frusto-conical seat 22 into which is adapted to be seated a cone 23 which is locked therein by a strainer body 24 which is internally threaded, as shown at 25, working on an externally threaded collar 26 of the head 21. The strainer body has an annular strainer 27, and is provided with a hub portion 28 having an internally threaded bore into which is adapted to extend a bolt 29 for securing a strainer cap 30 in position against the head, suitable packing being disposed between the cap and head in order to form a liquid-tight joint.

The strainer cap is provided with an inlet nipple 31 to which the delivery pipe 9 of the pump 10 is adapted to be connected, and an outlet nipple 32 to which the outlet pipe 13 extending to the reservoir is connected, whereby when the pump 10 is in operation, fuel from the reservoir will be circulated through the strainer so as to carry off the heat of the pump and prevent the formation of vapor. Disposed within the strainer cap is a relief valve 33 for building up and maintaining pressure of fuel within the pump, whereby vapor lock is prevented and an ample supply of fuel is supplied to the pump at all times, whereby any danger of any vapor accumulating in the line is prevented.

The relief valve 33 is in the form of a ball, and is carried by a cage 34 mounted within the strainer cap, as clearly shown in Fig. 13, said cage being provided with an adjustable plug 35 for adjusting the tension of the spring 36 employed for holding the valve 33 on its seat 37, and it will be seen that the relief valve can be readily inserted or removed by removing the plug 38.

Mounted within the casing 20 on the cone 23 is a rotor 39 provided with a conical socket having a lining or bushing 40, said socket corresponding in shape to the cone and upon which the rotor is mounted so as to revolve thereon. The inner end of the rotor is held slightly spaced from the head 21 by the cone 23, and the outer end of the rotor is provided with a socket 41 which is annularly enlarged to form a seat 42 in which is mounted a ball bearing 43.

The small end of the cone 23 is provided with a longitudinal bore 44 which is enlarged at 45 having an annular rib 46 provided with notches 47 through which is adapted to extend a notched flange 48 of a sleeve 49, slidably mounted on a stud 50 which is reduced at its outer end and externally threaded as shown at 51, and works in the internally threaded hub 52 of a handwheel 53.

The inner end of the stud is provided with a head 54 and disposed between the head and the sleeve 49 surrounding the stud is a coil spring 55 whereby the rotor is yieldably mounted on the cone in such a manner that it can be readily attached or detached. By giving the sleeve a quarter turn so as to bring the notches of the flange in alignment with the notches of the rib, one is capable of moving the parts longitudinally with respect to the other. This enables it to be assembled without the use of power presses.

After the members have been assembled and the bearing and handwheel are placed in position on the stud bolt for adjusting the same, the proper tension can be applied so as to hold the two inclined surfaces on the cone and rotor in contact under the desired pressure, and locked by a cotter pin 56, the ball bearing forming a thrust bearing as the spring conveys tension to the bearing. This provides a very efficient and simple means of mounting the rotor on the cone so that the proper tension can be applied to the spring in order to hold these two members in contact with one another under the proper pressure and yet allow the rotor to yield to compensate for expansion and contraction.

Disposed longitudinally within the rotor are bores 57 forming pump cylinders in which are mounted plungers 58 herein carried by plunger guide sleeves 59 locked in position by snap rings 60. The end of the plunger guide sleeve 59 engages a coil spring 61 which in turn engages a packing 62 surrounding the plunger as clearly shown in order to form a liquid-tight joint, and by this construction the over-all length of the pump can be reduced as in my prior constructions, wherein the spring was located to the rear of the guide.

Figure 8:
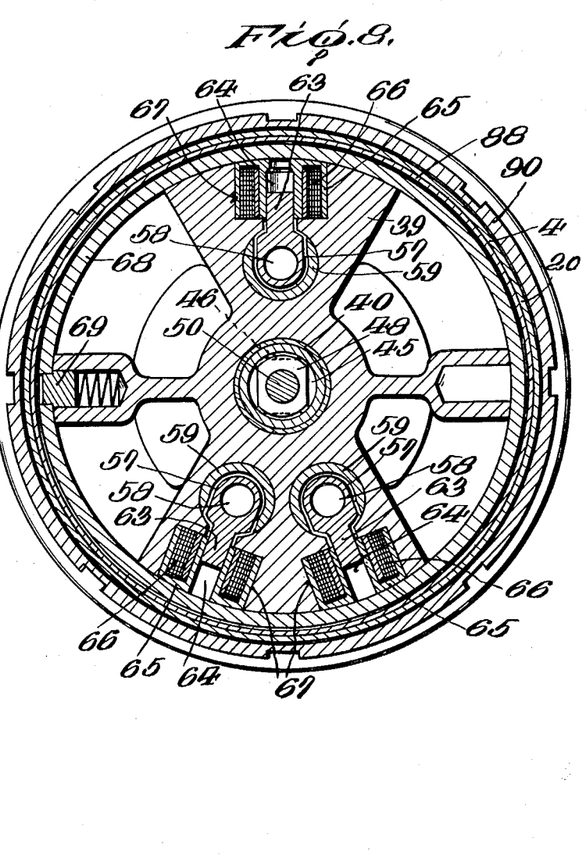
Fig. 8 is a section taken on line 8—8 of Fig. 5.
Figure 9:
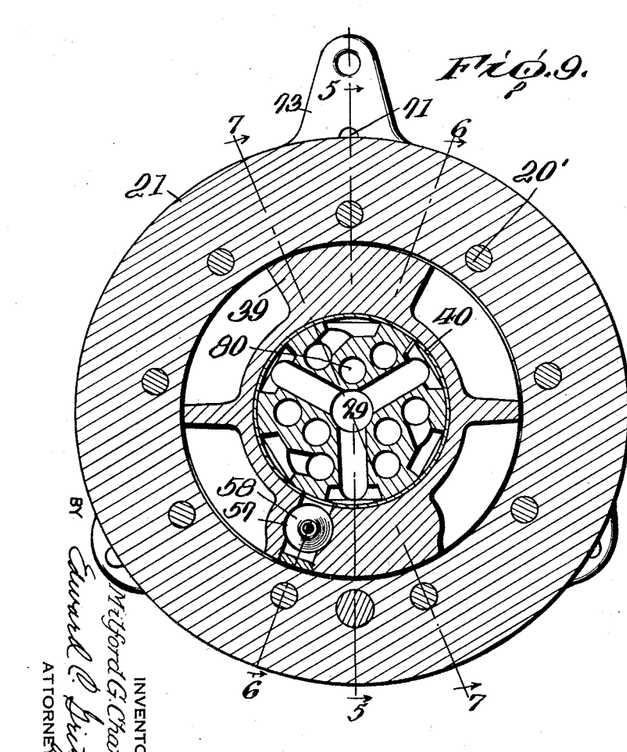
Fig. 9 is a section taken on line 9—9 of Fig. 5.

The guides are slotted and each plunger is provided with a laterally projecting driving lug 63 which extends into one of the hollow studs 64 of a roller shoe 65, each stud carrying a roller 66, one roller being adapted to engage the exhaust cam, and the other the intake cam, as will be hereinafter fully described. The roller shoes are mounted in guideways 67 formed in the rotor, and these slots are closed by rotor band 68 which surrounds the rotor over the slots and prevents the shoes from moving out of the slots. The band is placed in position and retained by a spring actuated plunger 69 (Fig. 8).

Figure 6:
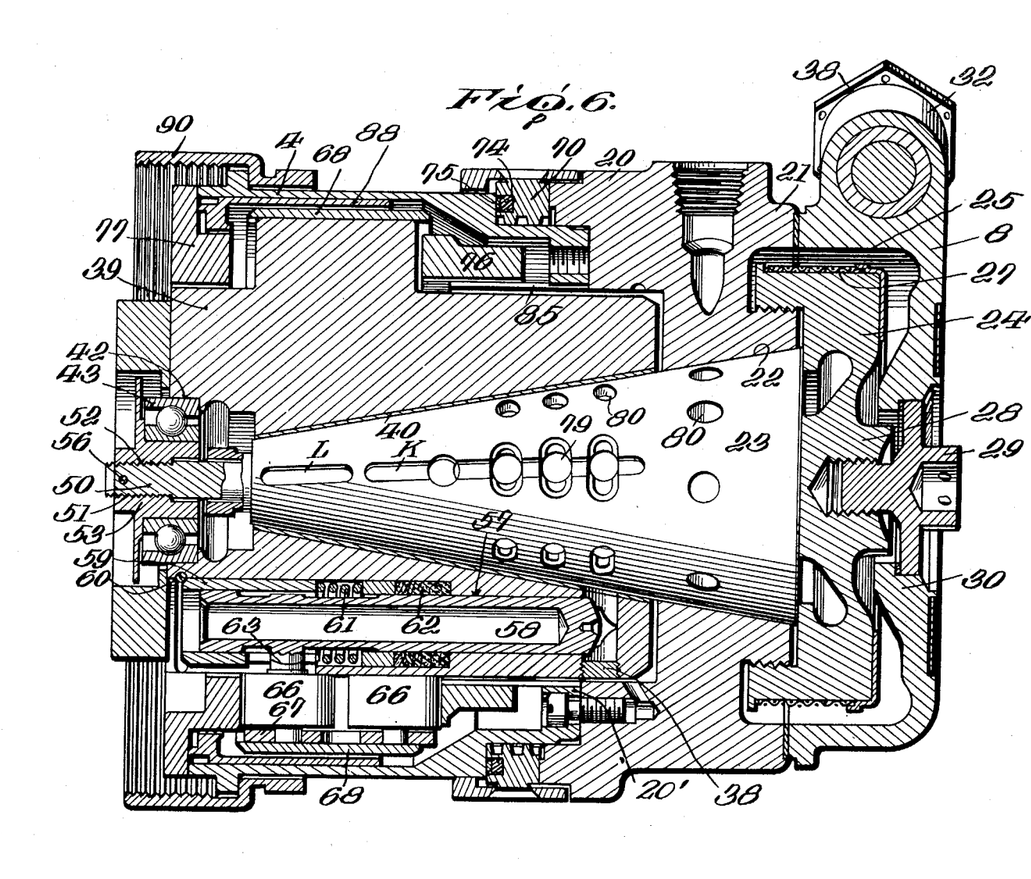
Fig. 6 is a longitudinal section taken on line 6—6 of Fig. 9, with the cone in elevation.
Figure 7:
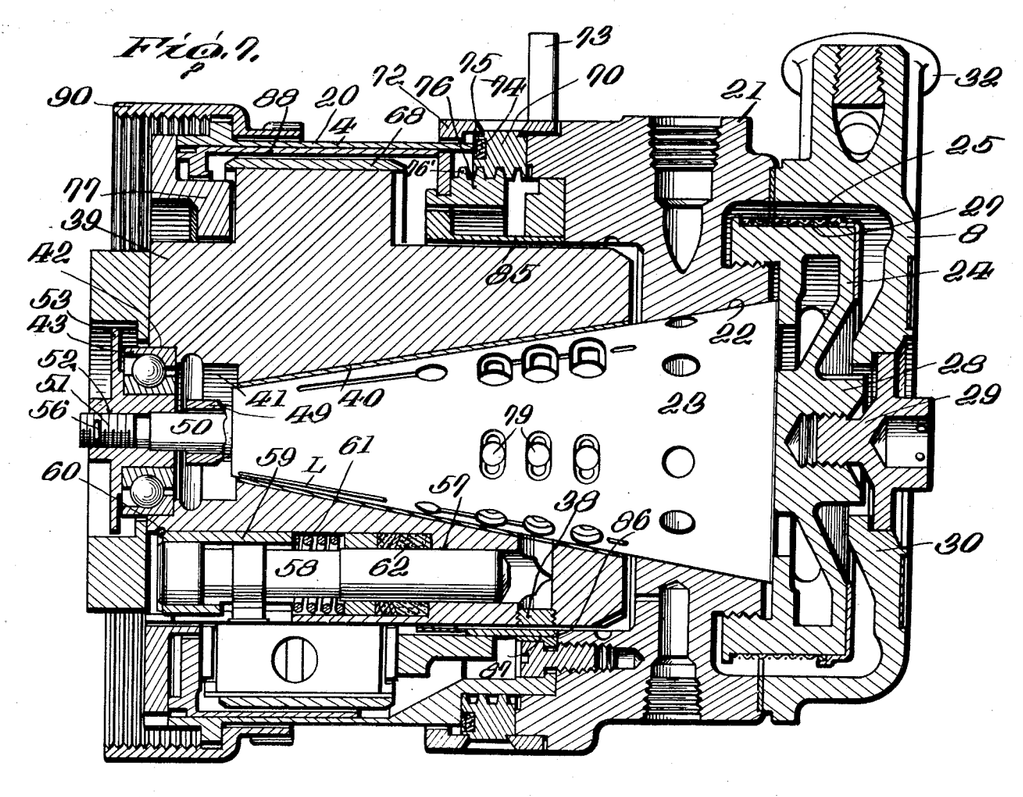
Fig. 7 is a longitudinal section taken on line 7—7 of Fig. 9, with the cone and plunger in elevation.
Figure 10:
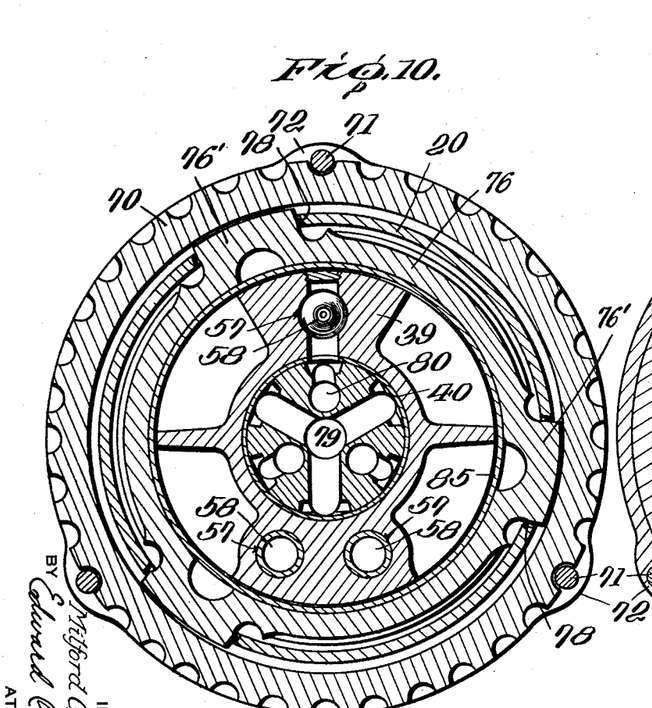
Fig. 10 is a section taken on line 10—10 of Fig. 5.
Figure 11:
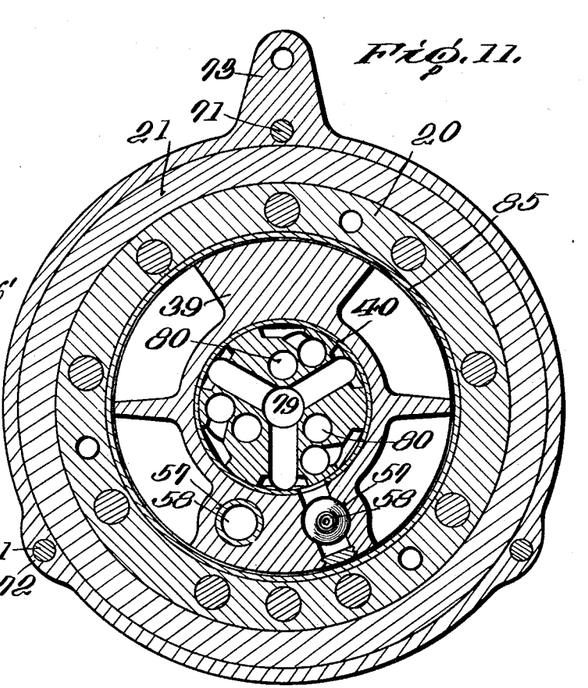
Fig. 11 is a transverse section taken on line 11—11 of Fig. 5.

In the construction shown, the casing 20 and head 21 are formed separate and are connected together by screws 20', as clearly shown in Fig. 6. The casing is reduced to form a recess in which is arranged an internally threaded cam nut 70 to which are clamped by screws 71, rings 72 and 73, the cam nut 70 being provided with an annular groove in which is arranged a cork ring 74 carrying a thin metal ring 75 to provide an oil-tight joint between said nut and casing. The cam nut 70 engages toothed lugs 76' of an intake cam 76, said lugs being slidably mounted in slots 78 (Fig. 10) formed in the casing so as to prevent the cam from rotating, and this provides means for adjusting the cam.

A non-rotatable exhaust cam 77 is fixed within the casing and is adapted to engage one of the rollers of the roller shoe so that as the rotor revolves, the intake and exhaust cams reciprocate the plungers in substantially the same manner as disclosed in my companion application.

The strainer element is designed for structural purposes, as well as to function as a strainer, the screen material being disposed about the outlet circumference in such a way that the fuel entering the intake flows into the clearance around the strainer, which is disposed in the strainer cap, said cap having a chamber to receive the strainer. The fuel then flows through the strainer element into a central axial intake passage 79 of the cone and eventually finds its way to the respective intake ports, as will be hereinafter fully described. The strainer is so constructed that the internal threads cooperate with external threads on the extension of the cone head which facilitates the insertion and removal of the strainer.

Disposed longitudinally within the cone are a plurality of exhaust ports 80, the outer ends of which are closed by plugs 81 which are engaged by the strainer body so as to exert pressure on the plugs to seat the same and to hold the cone firmly against its seat.

Figure 12:
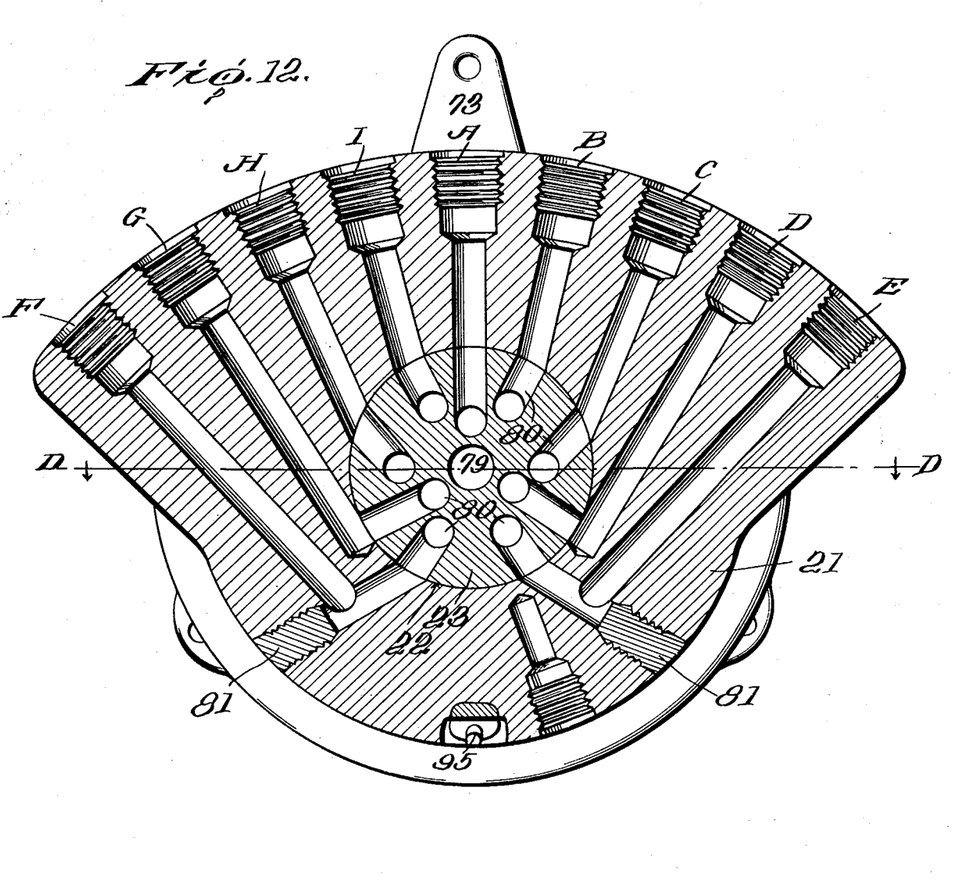
Fig. 12 is a transverse section taken on line 12—12 of Fig. 5.
Figure 16:
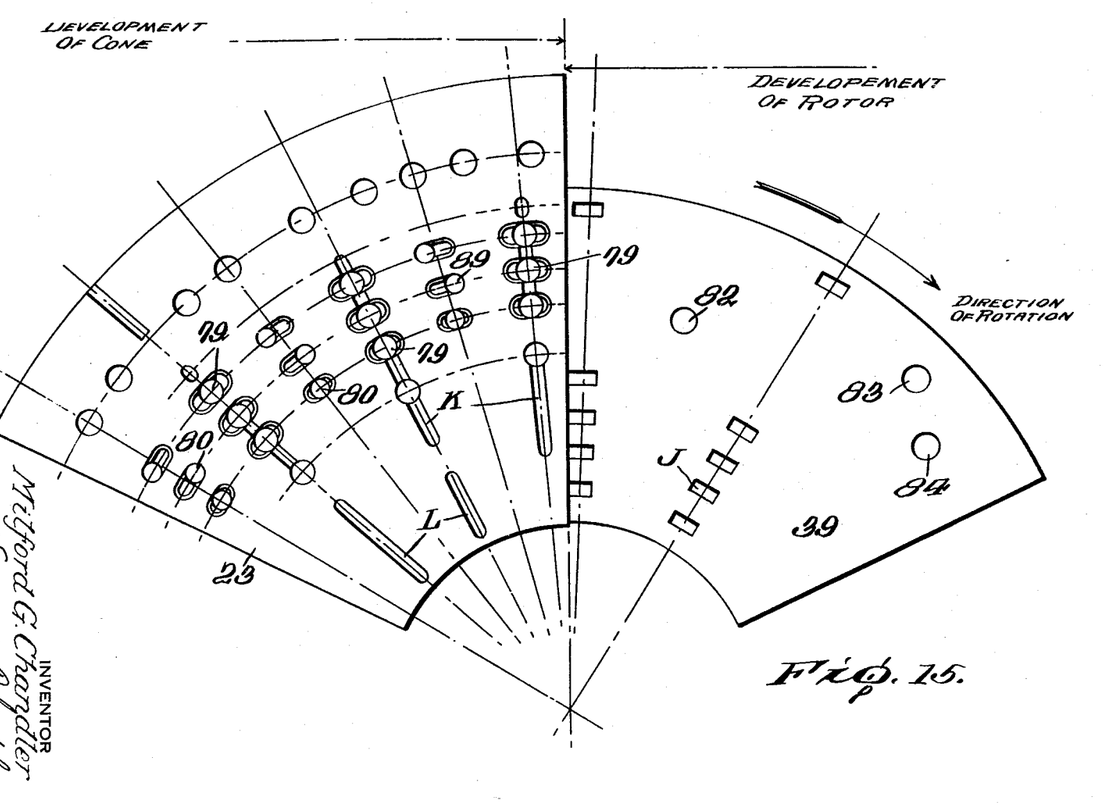
Fig. 16 is a side elevation of the cone.
Figures 17, 18, 19, 20:
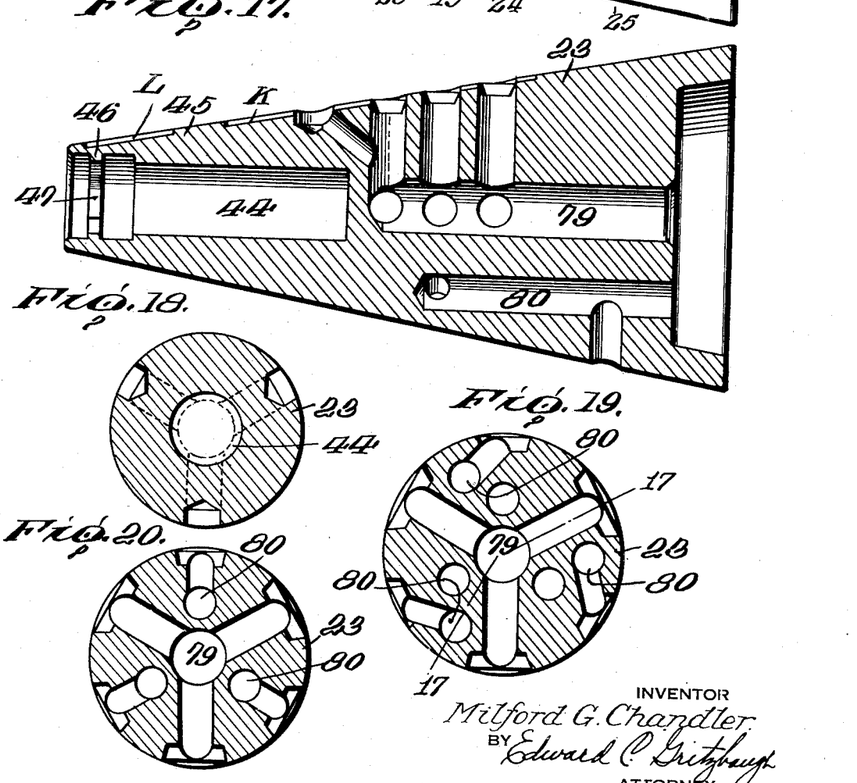
Fig. 17 is a section taken on line 17—17 of Fig. 19.
Fig. 18 is a section taken on line 18—18 of Fig. 16.
Fig. 19 is a section taken on line 19—19 of Fig. 16.
Fig. 20 is a section taken on line 20—20 of Fig. 16.
Figure 19:
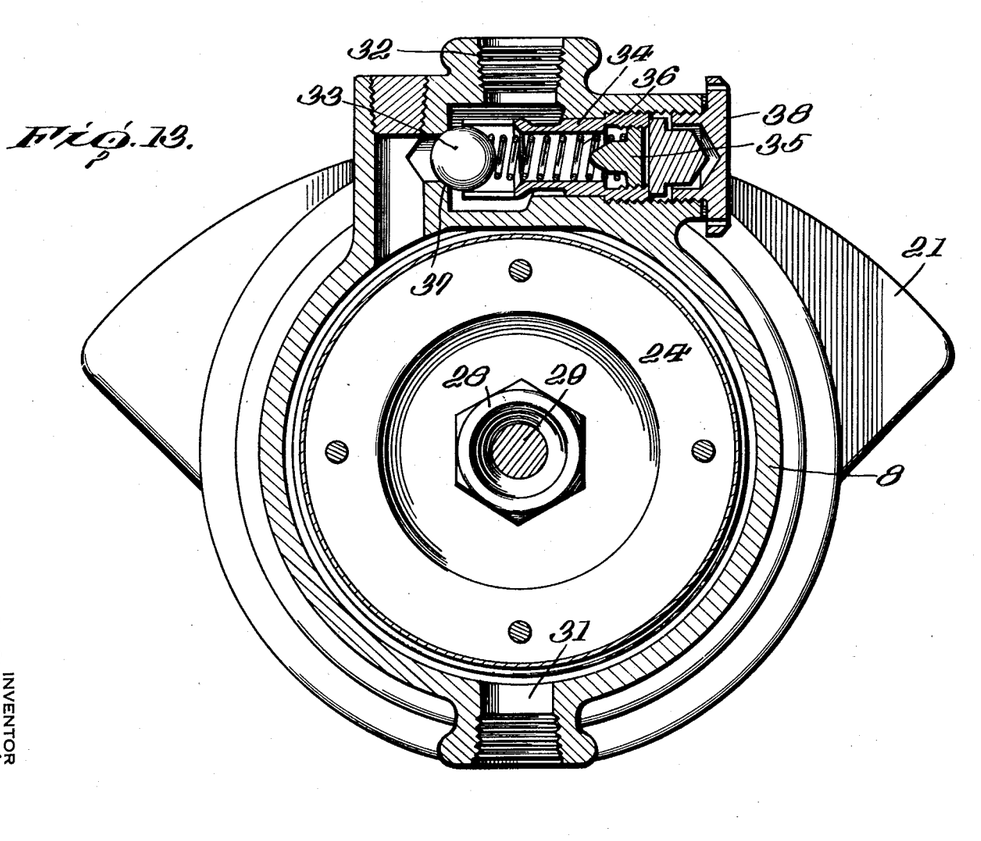
Figures 21, 22, 23:
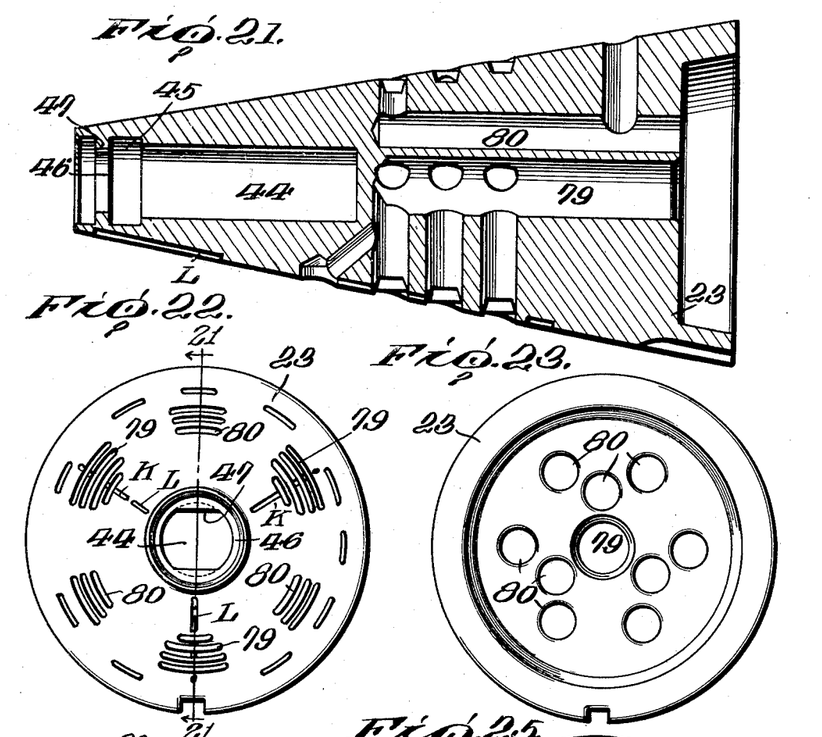
Fig. 21 is a section taken on line 21—21 of Fig. 22.
Fig. 22 is an end elevation of the cone.
Fig. 23 is an end elevation of the enlarged end of the cone.
Figures 24, 25:
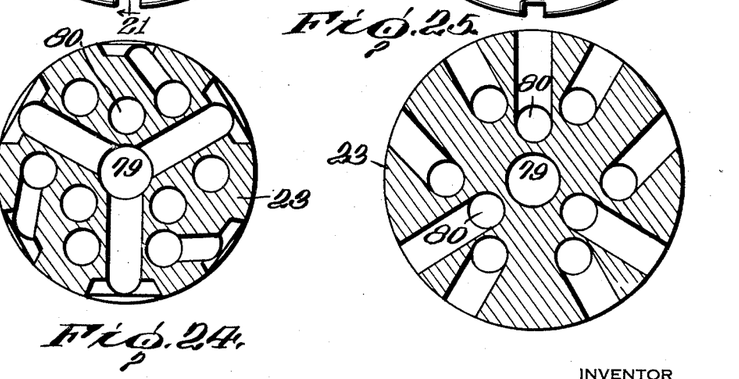
Fig. 24 is a section taken on line 24—24 of Fig. 16.
Fig. 25 is a section taken on line 25—25 of Fig. 16.

The head 21 of the casing is provided with nine exhaust passages, A, B, C, D, E, F, G, H and I, as shown in Fig. 12, to which the pipes 3 are connected for conveying fuel to the respective cylinders of the engine, and it will be noted that I have provided a construction which is especially adapted to be used in connection with a nine cylinder radial engine, and that the exhaust ports are so arranged that the fuel pipes can be readily connected on the discharge side of the pump facing the motor which facilitates the installation and provides a very novel means of feeding fuel to the respective intakes of the cylinders, as will be hereinafter fully described.

In Fig. 15 I have shown a diagrammatic view of the rotor and the cone and the rotor is provided with three pump cylinders having passages 82, 83 and 84 extending therethrough which are adapted to alternately register with the intake and the exhaust passages 79 and 80 of the cone, said intake and the exhaust passages 79 and 80 of the cone being provided with laterally offset passages, as clearly shown, so as to alternately register with the passages 82, 83 and 84, whereby fuel will be drawn into the respective pump cylinders alternately and discharged therefrom so that the respective cylinders will be supplied with measured charges at the proper time.

The lateral portions of the exhaust passage 80 register with the passages A, B, C, D, E, F, G, H and I as clearly shown in Fig. 12 so as to agree with the firing order of the engine, whereby the outlet A leads to cylinder number one; outlet B to cylinder number two; outlet C to cylinder number three; outlet D to cylinder number four; outlet E to cylinder number five; outlet F to cylinder number six; outlet G to cylinder number seven; outlet H to cylinder number eight, and outlet I to cylinder number nine, which in conjunction with the particular manner in which the outlets are brought out in a bank, permits an orderly arrangement of the delivery pipe in installing the device in an internal combustion engine of this type.

In the diagrammatic view illustrated in Fig. 15, the exhaust and intake ports are shown in the cone and the outlets of the pump cylinders so that when the rotor moves over these ports, first one cylinder receives its fuel from the intake and then exhausts the same so as to deliver a measured charge for the cylinder of the engine to which the device is attached.

The rotor is provided with a series of pockets J struck on the arc of a circle which intermittently register with channels K of the cone so as to lead the fuel onto the cone surface from the intake ports of the passage. Disposed on the cone surface in alignment with cone channels K are additional channels L which are not connected to the intake ports by passages and these receive the supply of fuel for lubricating the cone surface from the channels K by the action of the pockets J in the rotor, which pick up the fuel from the channels K in the course of their relative movement and intermittently depositing lubricant into the channels L which are not connected directly with the intake ports.

It will be noted that the channels K do not lead out close enough to the end of the bearing surface to allow leakage as there is always a frictional engaging surface between the ends of the channels and the end of the bearing surface. With this construction I am able to maintain a bearing surface in good condition from end to end of the engaging surfaces in spite of the gradually increased cone tension and allow the surface to run cool as the surfaces are held together under a pressure of approximately 150 lbs. applied to the axis and results in maintaining a gasoline film so thin that it gives ample support for a bearing film, but does not move out of the ends of the bearings between the cooperating surfaces.

I have found by experimenting that it is possible to maintain a film of this character for lubricating and still have the film pressure higher than the pressure at which the fuel is pumped so as to result in no leakage as the slots in the cones which intersect the pockets in the rotor have a tendency to collect and build up pressure to overcome the bearing pressure resulting from the tension of the spring, thereby maintaining between the two bearing surfaces a film which is under a greater pressure than the pressure developed by the pump so as to prevent leakage.

Figures 3, 14:
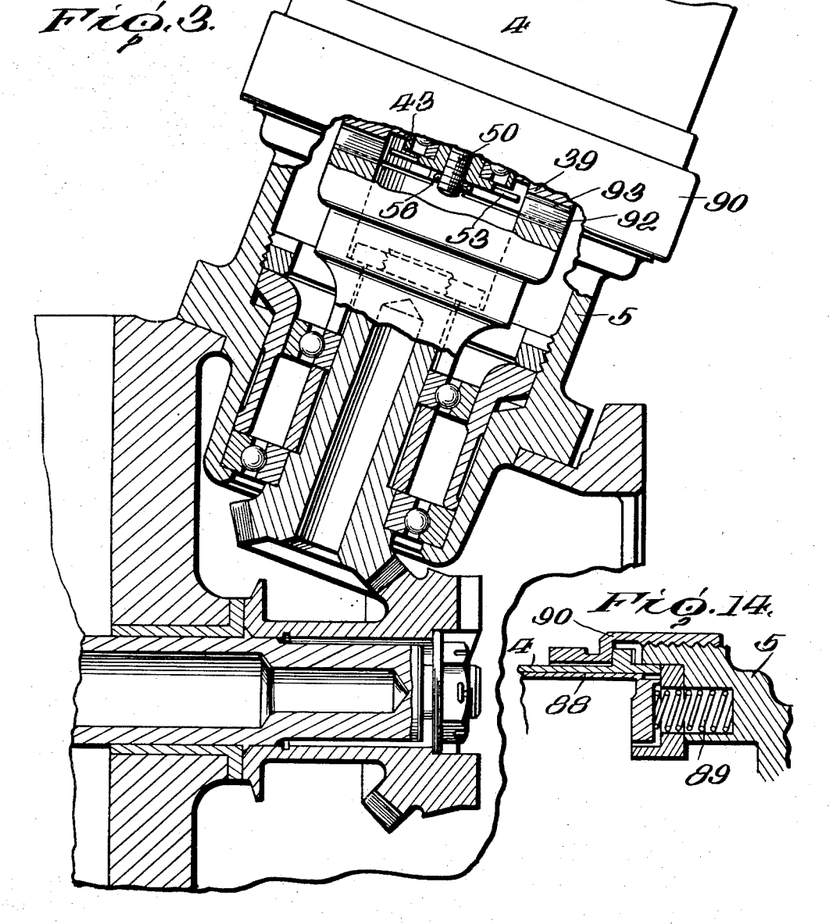
Fig. 3 is a detail enlarged section through the reduction gear assembly showing its driving connection with the internal combustion engine and with the rotor of the pump so that the pump will be driven and timed by the engine.
Fig. 14 is a detail section through a portion of the bottom and reduction gear assembly showing the over-travel sleeve spring in section in position against the over-travel sleeve.
Figure 4:
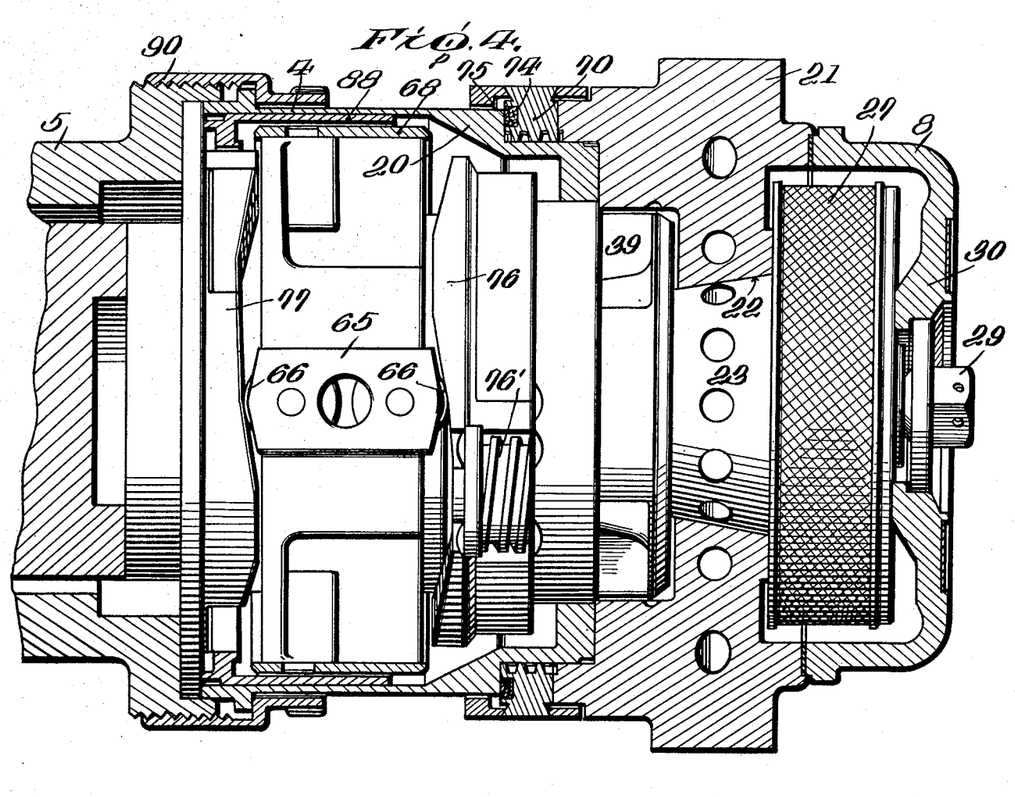
Fig. 4 is a longitudinal section through the measuring pump and a portion of the reduction gear assembly, the rotor and cone being shown in elevation.

Disposed within the casing is a fixed over-travel sleeve 85 supported at 86 against longitudinal movement and at 87 against radial movement. Arranged at the other end of the casing is an over-travel sleeve 88 which is engaged by springs 89, as shown in Fig. 14 of the reduction gear assembly, so as to yieldably hold this over-travel sleeve in engagement with the roller of the shoe. This limits the movement of the roller and plunger assembly on the exhaust stroke to prevent any movement after the roller has reached the peak of the cam and is substantially the same construction as shown in a companion application Serial No. 725,665.

The casing carries a coupling sleeve 90 for connecting the reduction gear assembly 5, and the rotor is provided with lugs 92 which cooperate with sockets 93 of a head of a drive shaft reduction gear, said reduction gear being disposed as clearly shown in Fig. 3, the pinion being driven from one of the moving parts of the engine so that the pump will be driven and timed by the engine in substantially the same manner as disclosed in my companion application Serial No. 725,665.

Figure 5:
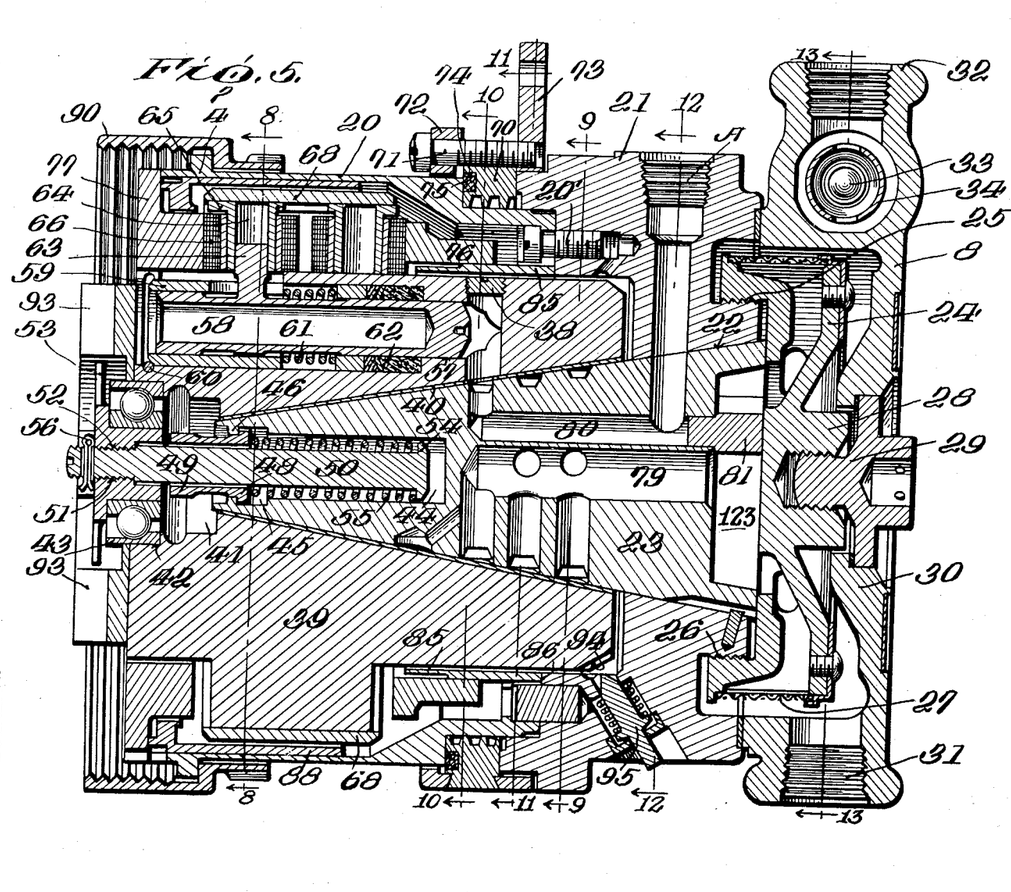
Fig. 5 is a longitudinal section taken on line 5—5 of Fig. 9.

The rotor is provided with a V-shaped slot 94 (Fig. 5) which is adapted to be engaged by a spring pressed plunger 95 when pressed inwardly for timing the pump as by pressing inwardly on the plunger while the rotor is being slowly revolved, the pointed end of the plunger will drop into the V-shaped slot in the rotor at the instant that the operating parts are in position to start injection to cylinder one of the engine to which the fuel feeding pump is attached, thereby facilitating the timing of the pump in respect to the engine.

In the construction as herein shown, the cone is slightly counterbored at 123 (Fig. 5) to form a pocket through which the fuel circulates so as to reduce the heat and as the fuel is circulating through the strainer cap and a portion of the cone, the heat generated is carried off by the fuel being circulated and this provides a novel construction of fuel feeding system wherein the measuring pump has circulating through the same at all times, fuel from which measured charges are drawn, which eliminates the drawing in of air bubbles and prevents vapor lock.

With this construction, I also overcome the difficulty of drag by employing two rollers on the cams and by mounting the cams in this particular manner, I am able to adjust the intake cam to vary the stroke of the piston of the pump to a nicety and reduce wear by the use of two rollers travelling on the opposing cams and in connection with the over-travel sleeve, I produce a construction of fuel measuring pump which will deliver measured charges of fuel to a multiple cylinder internal combustion engine as these charges can be varied to a nicety.

The fuel feeding means disclosed in this application is intended to be used in connection with an internal combustion engine of the spark ignition type and comprises a fuel feeding system employing a combined pump and distributor driven and timed by the engine for injecting measured charges of liquid fuel into the air intakes of the cylinder with means for simultaneously controlling the measured charges of fuel with the air taken in the cylinders of the engine, and while I have not shown the nozzles for spraying the fuel, I wish it to be clearly understood that my system of fuel injection employs means for placing fuel under pressure and injecting said fuel from a nozzle for reducing the fuel to a fine spray, whereby an explosive mixture can be produced in which the mixture ratio is controlled throughout the various ranges of speed and load.

While I have shown and described a fuel feeding means for internal combustion engines of the spark ignition type, I wish it to be clearly understood that I do not wish to limit myself to the use of my improved fuel feeding system to any particular type of engine.

The operation of a fuel feeding means for internal combustion engines constructed in accordance with my invention is as follows: The rotor is driven and timed by the engine through the medium of the reduction gear assembly and as the rotor revolves, the plungers carrying the spaced rollers are reciprocated by traveling over the non-rotatable cams, and as one of these cams is adjustable axially, the stroke of the plungers can be regulated so as to vary the measured charges and the means for adjusting the position of the movable cam is connected to the air controlling means of the internal combustion engine, whereby the proper proportion of fuel to air will be maintained. As the rotor is mounted on a cone having intake and exhaust ports, which communicate intermittently with the respective plunger cylinders, fuel is drawn or forced into the plunger cylinders and injected therefrom into the respective cylinders of the engine.

In the installation of my improved construction of pump as herein shown, an auxiliary pump is employed for drawing fuel from a source of supply and causing said fuel to circulate through the measuring pump so as to eliminate the formation of bubbles and in the embodiment of the invention as herein shown, a relief valve is employed for building up pressure.

The two bearing surfaces which are inclined to the axis of the respective members are yieldably held in contact with one another and one of said members is provided with channels in communication with the intake ports and the other is provided with pockets whereby the two bearing surfaces will be thoroughly lubricated as the rotor revolves as the pressure is built up on the surfaces resulting from the tension of the spring which prevents leakage and provides novel means for thoroughly lubricating the surfaces as the rotor is revolved and yet prevents the use of an excessively strong spring to hold these two members in contact with one another.

A pump constructed in accordance with my invention having means for lubricating the bearing surfaces of the rotor and means for building up and maintaining pressure in the circulatory system, provides a pump which will work satisfactorily under all atmospheric conditions and with all kinds of fuel and eliminates all danger of vapor accumulating in the line and provides means for supplying ample fuel to the measuring pump at all times and under all conditions.

In the drawings I have illustrated the application of my improved construction of combined pump and distributor used in connection with an auxiliary pump and a supercharger, but I do not wish to limit myself to the use of either of these devices as my improved construction of measuring pump and distributor will operate without either of these devices.

Application Serial No. 290,492, filed July 5, 1928, since issued as Patent No. 2,022,653, bearing date of December 3, 1935, contains claims directed more broadly to the means for reciprocating the plungers, the means for varying the stroke of the plungers, and means for preventing over-travel. Said application also contains claims directed to the arrangement of the ports in the conical stationary member and the rotor, as well as the means for holding the rotor resiliently on the stationary conical member. Application Serial No. 725,665 contains claims directed to the double roller construction for actuating the plungers, the means for preventing over-travel of the plungers in both directions, and the means for mounting the rotor on the conical stationary member. Application Serial No. 725,667 contains claims directed to the means for supplying fuel to the intake ports of the distributor.

I claim:

1. A fuel feeding means for internal combustion engines comprising a combined pump and distributor, said pump comprising a rotor with a reciprocating piston, said distributor comprising a stationary member with a longitudinally disposed fuel inlet and a series of intake ports having lubricating channels in communication therewith, said members having contacting faces inclined to the axis of said members, the inclined surfaces of the rotor being provided with lubricating channels adapted to intermittently register with the channels of the stationary member, means for resiliently holding said members together, and means forming a fuel outlet.

2. A fuel feeding means for internal combustion engines comprising a combined pump and distributor, said pump comprising a rotor with a reciprocating piston, said distributor comprising a stationary member with a longitudinally disposed fuel inlet, and a series of intake ports, said members having contacting faces inclined to the axis of said members, said inclined surfaces being provided with lubricating channels adapted to intermittently register with one another as the rotor member revolves, means for resiliently holding said members together, and means forming a fuel outlet.

3. A fuel feeding means for internal combustion engines comprising a combined pump and distributor, said pump comprising a rotor provided with a conical socket and reciprocating pistons, said distributor comprising a stationary cone with a fuel inlet having a series of ports adapted to fit in the socket of the rotor, and fuel outlet means, the inclined contacting surfaces of said members being provided with lubricating channels adapted to intermittently register with one another as the rotor revolves, and means for resiliently holding said members together.

4. A fuel feeding means for internal combustion engines comprising a combined pump and distributor, said pump comprising a rotor provided with a conical socket and with reciprocating pistons operated by stationary cams, means for adjusting said cams to vary the stroke of said pistons, said distributor comprising a stationary cone provided with fuel outlet means and a fuel inlet having a series of intake ports adapted to fit within the socket of said rotor, the inclined contacting surfaces of said members being provided with lubricating channels adapted to intermittently register with one another as the rotor member revolves, and means for resiliently holding said members together.

5. A fuel feeding means for internal combustion engines comprising a combined pump and distributor, said pump comprising a rotor with a reciprocating piston, said distributor comprising a stationary member with fuel inlet and outlet ports, said members having contacting surfaces inclined to the axis of said members, means for initially securing said members together under a predetermined tension, and means adjustable after the members have been assembled and initially tensioned for finally increasing the tension between said members to a fixed value, said first named means directly contacting both said rotor and said distributor.

6. A fuel feeding means for internal combustion engines comprising a combined pump and distributor, said pump comprising a rotor with a reciprocating piston, said distributor comprising a stationary member with fuel inlet and outlet ports, said members having contacting surfaces inclined to the axis of said members, means for detachably securing said members together under a predetermined initial tension, and means for finally increasing the tension between said members to a fixed higher tension after they have been secured together.

7. A fuel feeding means for internal combustion engines comprising a combined pump and distributor, said pump comprising a rotor provided with a conical socket and reciprocating pistons, said distributor comprising a conical member with fuel inlet and outlet ports and adapted to fit within said socket, a bayonet slot connection between said rotor and conical member, and means for finally placing said members under a predetermined tension for resiliently holding said members together.

8. In means for feeding fuel to an internal combustion engine, a combined pump and distributor, said pump comprising a rotor provided with a reciprocating piston, said distributor comprising a stationary member with fuel inlet and outlet ports, said members having contacting surfaces inclined to the axis of said members, said rotor being provided with a notch and a spring-pressed plunger mounted on the distributor and cooperating with said notch for locating the rotor with respect to the distributor for timing purposes, and means for holding said members together.

9. A fuel feeding means for internal combustion engines comprising a combined pump and distributor, said pump comprising a rotor with a reciprocating piston, said distributor comprising a stationary member, said rotor and said distributor having contacting surfaces inclined to the axis of said rotor, and lubricating channels formed in the inclined surfaces of both said rotor and said distributor adapted intermittently to register with one another as the rotor revolves.

10. A fuel feeding means for an internal combustion engine comprising a combined pump and distributor, said pump comprising a rotor provided with a conical socket and a reciprocating piston, said distributor comprising a stationary conical member with fuel inlet and outlet ports and adapted to fit within the socket of said rotor, and means directly engageable with both said rotor and said distributor to place the rotor and distributor under an initial tension and operable after engagement to place the same under a final higher tension, said means being readily disengaged from both the rotor and the distributor.

11. A fuel feeding means for an internal combustion engine comprising a combined pump and distributor, said pump comprising a rotor provided with a conical socket and a reciprocating piston, said distributor comprising a stationary conical member with fuel inlet and outlet ports and adapted to fit within the socket of said rotor, and means for retaining said distributor in the rotor under tension comprising a stud having a head at one end, and threaded at the other end, a sleeve slidable on said stud, a compression spring encircling said stud bearing at one end against said head and at the other end against said sleeve, said sleeve and said distributor having a bayonet slot connection for convenient engagement, and means for engaging said rotor including a member screwed onto the threaded end of said stud.

12. A fuel feeding means for internal combustion engines comprising in combination a casing having a conical seat, a ported cone-shaped distributor extending into said casing and seated near its base in the conical portion of said casing, a pumping means carrying member having a conical recess enabling said member to fit over said cone-shaped distributor, cylinders in said carrying member adapted to register with the ports in said cone-shaped distributor and pistons in said cylinders, means for reciprocating said pistons in timed relation to the relative rotation of said distributor and said carrying member, and means engaging the apex of said cone-shaped distributor and said carrying member resiliently urging said carrying member onto the distributor in sealing relationship, the portion of the means engaging the carrying member being at all times spaced from and out of engagement with the distributor.

MILFORD G. CHANDLER.